July 12, 1949.   E. H. WRIGHT   2,476,014
LIGHT POLARISER FOR PRODUCING LIGHT BEAMS POLARISED
IN PLANES MUTUALLY AT RIGHT ANGLES FROM A
SINGLE LIGHT BEAM
Filed March 23, 1945
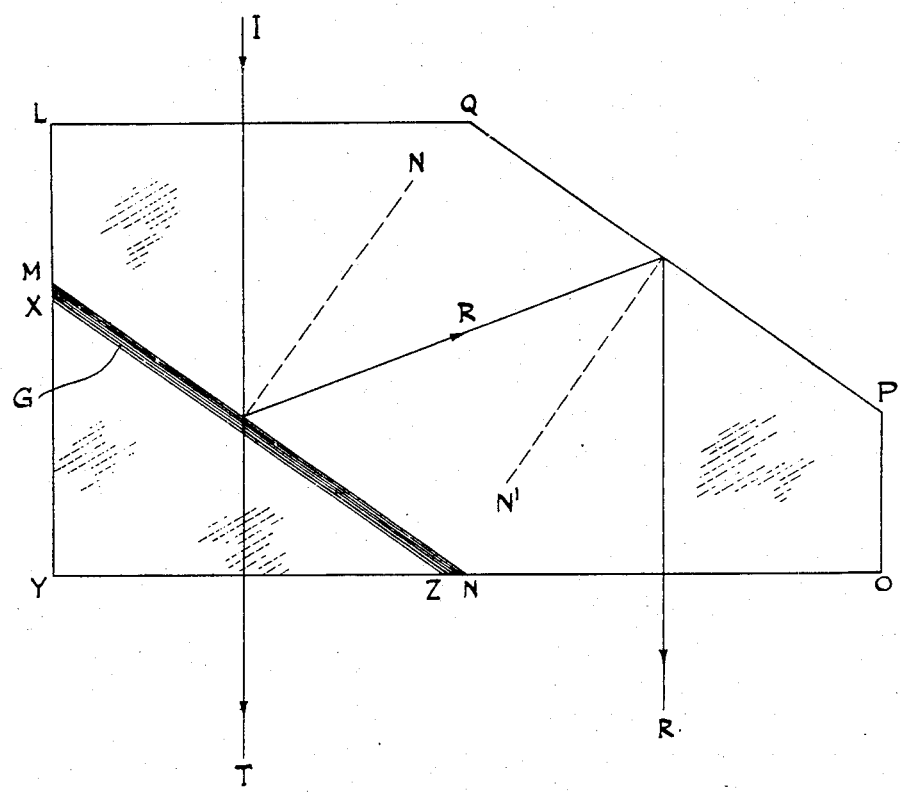
INVENTOR.
EDWIN HERBERT WRIGHT
by Haseltine Lake & Co.
ATTORNEYS.

Patented July 12, 1949

2,476,014

UNITED STATES PATENT OFFICE 2,476,014

LIGHT POLARISER FOR PRODUCING LIGHT BEAMS POLARISED IN PLANES MUTUALLY AT RIGHT ANGLES FROM A SINGLE LIGHT BEAM

Edwin Herbert Wright, Farnham Common, England

Application March 23, 1945, Serial No. 584,281
In Great Britain April 17, 1944

4 Claims. (Cl. 88—65)

This invention relates to light-polarisers.

Light-polarisers are often used in stereoscopic cinematography and it has been found that the forms of sheet polariser at present available are incapable of withstanding, over a prolonged period of use, the considerable quantity of heat generated by the intense light source used in the projection system. The possibility of using the well-known form of polariser, consisting of a bunch of plates of refractive material disposed at the polarising angle to the light beam, which angle depends upon the nature of the refractive material, has therefore been investigated, and in order to obtain a polariser of sufficiently wide aperture, it has been proposed to sandwich the plates between the adjacent hypotenuses of two right-angled prisms, whereby the refractive plates can be disposed at a greater angle to the light beam than corresponds to the polarising angle in view of the double refraction of the light on entering and leaving the refractive plates, as will be clear from a consideration of Figure 1 of the accompanying drawings. With such a form of polariser, however, the reflected rays are lost and this represents a considerable light loss which is very undesirable in motion picture projection.

The principal object of the present invention is to avoid this undesirable light loss while retaining the increased angle of the polariser to the light beam.

According to the invention, a light-polariser consists of a number of plates of refractive material sandwiched between the hypotenuse of a right-angled prism and the adjacent face of another prism through which the light beam passes before reaching the refractive plates, said other prism having a face normal to the incident beam, a surface parallel to the surface contacting the refractive plates and adapted to reflect the rays reflected from said plates, and a face normal to the emergent rays.

It will be seen that such light polarisers can be disposed with the refractive plates at an angle to the light beam greater than the polarising angle, since the light is refracted by the first prism so that it strikes the refractive plates at the correct polarising angle while it is refracted by the second prism to compensate for the refraction by the first prism.

A light polariser according to the present invention therefore has an increased aperture for a given size of refractive plate and it follows that the size of plate required to produce a given aperture is less whereby the bulk of the polariser is reduced, which is an important advantage in using the polariser for the purposes of stereoscopic projection.

Referring to the figure, XYZ is a right-angled prism and LMNOPQ is a prism having the pairs of parallel sides MN, PQ; LQ, NO and LM, OP respectively. A polarising pile of refractive plates G of a light-transmitting material, such as lamina-separated mica prepared by heating to produce cleavage between the structural layers of the mica so that in effect a pile of mica plates of microscopic thickness is produced. Such lamina-separated mica is sandwiched between the faces XZ and MN, giving a polariser of increased aperture in known manner. The transmitted plane-polarised beam T passes out of the face YZ of the prism XYZ. The reflected oppositely plane-polarised beam R is reflected by the face PQ of the prism LMNOPQ, which face may be silvered or blackened if desired, and passes out of the face NO of the last-mentioned prism. The complementary angles of the prism XYZ will vary slightly in accordance with the refractive index of the material, but, as shown, are 56° and 34° respectively.

The nature of the light emerging from the faces YZ and NO may be varied by the incorporation of suitable optical devices at any one of the faces XZ, YZ, or NO. Thus, if quarter-wave retardation plates with parallel axes were attached to the faces NO and XZ, the light leaving the faces YZ and NO would be clockwise and anti-clockwise circularly-polarized respectively. Again, a correctly oriented half-wave retardation plate attached to any one of the faces XZ, YZ or NO would rotate the plane of either the transmitted or the reflected beam through 90° so that all the light emerging from the device would be of the same polarity.

I claim:

1. A light-polariser for the production from a single light beam of two parallel and contiguous beams, polarised in planes mutually at right angles, comprising a polarising transmitting and reflecting laminae-separated layer of mica, a right-angled glass prism arranged with its hypotenuse in contact with said layer of mica and having a face through which the polarised beam transmitted by the mica layer emerges, and a second glass prism having a face in contact with said mica layer, a face parallel to said mica-contacting face, said parallel face reflecting the polarised beam reflected from the mica layer, and a face in continuity with the emergent face of the right-angled prism through which the reflected polarised light beam emerges.

2. A light-polariser for the production from a single light beam of two parallel and contiguous beams polarised in planes mutually at right angles, comprising a right-angled glass prism, a second glass prism having an inclined interface parallel to the hypotenuse of said right-angled prism, a reflecting face to the rear of and parallel to said inclined face, a face in continuity with a right-angle face of said right-angled prism, and a face to the rear of and parallel to said right-angle face, and sandwiched between the hypotenuse to said right-angled prism and the inclined face of said second prism parallel to said hypotenuse, a polarising transmitting and reflecting laminae-separated layer of mica, whereby a light beam incident upon said layer is divided into two beams polarised in planes mutually at right angles, one of said beams being transmitted through said right-angled prism while the other of said beams is reflected by said inclined face and emerges through the face that is in continuity with a right-angle face of said right-angled prism, said polarised beams thus emerging as parallel beams polarised in planes mutually at right angles.

3. A light polariser for the production from a single light beam of two parallel and contiguous beams polarised in planes mutually at right angles, comprising a right-angled prism having an emergent face and an interface, a compound prism having an incident face, an emergent face in substantial continuity with the emergent face of said right-angled prism, an interface and a reflecting face parallel and to the rear of said interface, the line of intersection of said incident face and said reflecting face being at a distance from a normal to said incident face not greater than the distance from said normal of the line of intersection of the interface with the emergent face, and a polarising transmitting and reflecting laminae-separated layer of mica, said layer being secured between the interfaces of said prisms.

4. A light polariser for the production from a single light beam of two parallel and contiguous beams polarised in planes mutually at right angles, comprising a right-angled prism having an emergent face and an interface being the hypotenuse of said prism, a compound prism having an incident face parallel to and to the rear of the emergent face of said right-angled prism, an emergent face aligned with and abutting the emergent face of said right-angled prism, an interface parallel to the interface of said right-angled prism, and a reflecting face parallel to and to the rear of said interface, the line of intersection of said incident face and said reflecting face being at a distance from a normal to said incident face not greater than the distance from said normal of the line of intersection of the interface with the emergent face, and a polarising transmitting and reflecting laminae-separated layer of mica, secured between the interfaces of said prisms.

EDWIN HERBERT WRIGHT.

REFERENCES CITED

The following references are of record in the file of this patent:

UNITED STATES PATENTS

| Number | Name | Date |
| --- | --- | --- |
| 1,358,413 | Brodsky | Nov. 9, 1920 |
| 1,963,127 | Gardner | June 19, 1934 |
| 2,274,110 | Ward | Feb. 24, 1942 |
| 2,403,731 | MacNeille | July 9, 1946 |

FOREIGN PATENTS

| Number | Country | Date |
| --- | --- | --- |
| 43,569 | Germany | June 6, 1888 |
| 506,102 | France | May 21, 1920 |
| 319,869 | Great Britain | Oct. 3, 1929 |
| 398,100 | Great Britain | Sept. 7, 1933 |
| 460,666 | Great Britain | Jan. 28, 1937 |

OTHER REFERENCES

Fobes, article on Use of Mica in Polarized Light in Report on the (Br.) Assoc. for Advancement of Science, vol. 9, 1839, Notice and Abstract Section, pages 6 and 7.

Chowdhury Text "Handbook of Mica," published by Chem. Pub. Co., Brooklyn, New York (1941), pages 16, 21, 29, 32 and 219.